(12) United States Patent
Willey

(10) Patent No.: US 7,678,500 B2
(45) Date of Patent: Mar. 16, 2010

(54) EXPANDABLE BATTERY COMPARTMENT

(75) Inventor: Charles D. Willey, Roanoke, VA (US)

(73) Assignee: ITT Manufacturing Enterprises, Inc., Wilmington, DE (US)

( * ) Notice: Subject to any disclaimer, the term of this patent is extended or adjusted under 35 U.S.C. 154(b) by 77 days.

(21) Appl. No.: 11/947,161

(22) Filed: Nov. 29, 2007

(65) Prior Publication Data

US 2009/0142652 A1  Jun. 4, 2009

(51) Int. Cl.
*H01M 2/10* (2006.01)
*H01M 10/38* (2006.01)
*H01M 2/04* (2006.01)
*H01M 6/42* (2006.01)

(52) U.S. Cl. .................. 429/175; 429/100; 429/123; 429/159; 429/96; 29/623.1

(58) Field of Classification Search .............. 429/9, 429/127, 221, 112, 181, 152, 96, 123, 100; 362/205, 208; 220/500, 592; 224/902; 119/497; 29/623.1
See application file for complete search history.

(56) References Cited

U.S. PATENT DOCUMENTS

| | | | |
|---|---|---|---|
| 3,089,072 A * | 5/1963 | Jephcott .................. 320/112 |
| 5,015,546 A | 5/1991 | Dulaney et al. | |
| 5,395,263 A | 3/1995 | Sandell | |
| 6,942,359 B2 * | 9/2005 | Furth et al. .................. 362/205 |
| 6,971,333 B1 * | 12/2005 | Hearrell ...................... 119/482 |
| 2004/0151963 A1 | 8/2004 | Buchanan, Jr. et al. | |
| 2006/0191183 A1 * | 8/2006 | Griffin ........................... 42/72 |
| 2007/0082234 A1 | 4/2007 | Ladouceur et al. | |

* cited by examiner

*Primary Examiner*—Jonathan Crepeau
*Assistant Examiner*—Kenneth Douyette
(74) *Attorney, Agent, or Firm*—RatnerPrestia

(57) ABSTRACT

In a battery-powered electrical device, an expandable battery compartment for accommodating batteries of varying size, and a method for altering the size of the battery compartment, is disclosed. The battery compartment includes a battery casing defining a substantially cylindrical recess for at least partially encapsulating a battery. The recess has an open end for receiving a battery and a closed end. A first electrical contact element is positioned on or adjacent the closed end of the recess for contacting a terminal of a battery. A cover is configured to be releasably mounted to the open end of the recess for selectively concealing the open end and defining the battery compartment. A second electrical contact element is provided for contacting an opposing terminal of the battery. The second electrical contact element is selectively positionable at multiple locations on the cover to accommodate batteries of varying size within the battery compartment.

16 Claims, 2 Drawing Sheets

EXPANDABLE BATTERY COMPARTMENT

TECHNICAL FIELD

The present invention relates to an expandable battery compartment for accommodating multiple battery sizes.

BACKGROUND OF THE INVENTION

The invention relates to battery powered electrical equipment, and in particular the invention is concerned with a battery compartment for a battery powered electrical device that accommodates different types of batteries having different exterior dimensions. Conventional portable electrical or electronic devices such as night vision goggles, camera flashes, tape recorders, games and computers are typically powered by standard dry cell batteries, such as alkaline type battery cells of standard dimensions.

It has been a limitation of many conventional battery compartments of portable electrical devices in general, that a particular battery compartment could accommodate a battery or batteries of one particular size. It would therefore be desirable in a great number of portable devices for a battery compartment to be configured for receiving batteries of multiple sizes. In this way, a user could populate the portable electrical device with a wider variety of batteries.

SUMMARY OF THE INVENTION

According to an aspect of the invention, an expandable battery compartment of an electrical device for accommodating batteries of varying size is provided. The battery compartment includes a battery casing defining a substantially cylindrical recess for at least partially encapsulating a battery. The recess has an open end for receiving a battery and a closed end. A first electrical contact element is positioned on or adjacent the closed end of the recess for contacting a terminal of a battery. The first electrical contact is electrically coupled to circuitry of the electrical device. A cover is configured to be releasably mounted to the open end of the recess for selectively concealing the open end and defining the battery compartment. A second electrical contact element is provided for contacting an opposing terminal of the battery. The second electrical contact element is selectively positionable at multiple locations on the cover to accommodate batteries of varying size within the battery compartment.

According to another aspect of the invention, a plurality of means are positioned on the cover for receiving the second electrical contact element, wherein each means for receiving is positioned at a discrete location on the cover and configured to independently receive the second electrical contact element to accommodate batteries of varying size within the battery compartment.

According to yet another aspect of the invention, a method of altering the size of the battery compartment is provided. The method comprises the step of removing an electrical contact element that is configured for contacting a battery terminal from a first groove formed along the interior circumference of the cover. The electrical contact element is then positioned in a second groove that is formed along the interior circumference of the cover and separated from the first groove.

BRIEF DESCRIPTION OF THE FIGURES

The invention is best understood from the following detailed description when read in connection with the accompanying drawing. It is emphasized that, according to common practice, the various features of the drawing are not to scale. Included in the drawing are the following figures.

DETAILED DESCRIPTION OF THE INVENTION

Figure 1A:
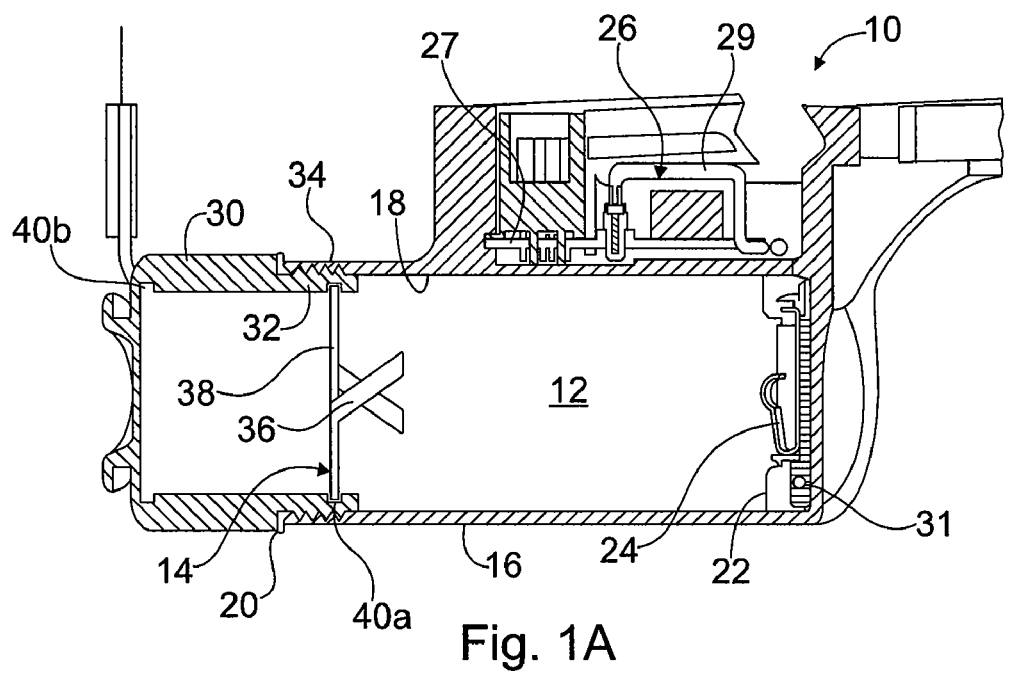
FIG. 1A depicts a cross-sectional view of a battery compartment of an electrical device, according to one aspect of the invention, wherein a contact element is located in a first position to accommodate a DL123 battery.

This invention will now be described with reference to several embodiments selected for illustration in the drawings. It will be appreciated that the scope and spirit of the invention are not limited to the illustrated embodiments.

Referring generally to the figures, according to an aspect of the invention, an expandable battery compartment 12 of an electrical device 10 for accommodating batteries of varying size is provided. The battery compartment 12 includes a battery casing 16 defining a substantially cylindrical recess 18 for at least partially encapsulating a battery. The recess 18 has an open end 20 for receiving a battery and a closed end 22 opposite the open end 20. A first electrical contact element 24 is positioned on or adjacent the closed end 22 of the recess 18 for contacting a terminal of a battery. The first electrical contact 24 is electrically coupled to circuitry 26 of the electrical device 10. A cover 30 is configured to be releasably mounted to the open end 20 of the recess 18 for selectively concealing the open end 20 and defining the battery compartment 12. A second electrical contact element 14 is provided for contacting an opposing terminal of the battery. The second electrical contact element 14 is selectively positionable at multiple locations 40A, 40B on the cover 30 to accommodate batteries of varying size within the battery compartment 12.

According to another aspect of the invention, a plurality of means 40A, 40B are positioned on the cover 30 for receiving the second electrical contact element 14, wherein each means for receiving 40A, 40B is positioned at a discrete location on the cover 30 and configured to independently receive the second electrical contact element 14 to accommodate batteries of varying size within the battery compartment 12.

According to yet another aspect of the invention, a method of altering the size of the battery compartment 12 is provided. The method comprises the step of removing an electrical contact element 14 that is configured for contacting a battery terminal from a first groove 40A formed along the interior circumference of the cover 30. The electrical contact element 14 is then positioned in a second groove 40B that is formed along the interior circumference of the cover 30 and separated from the first groove 40A.

Figure 1B:
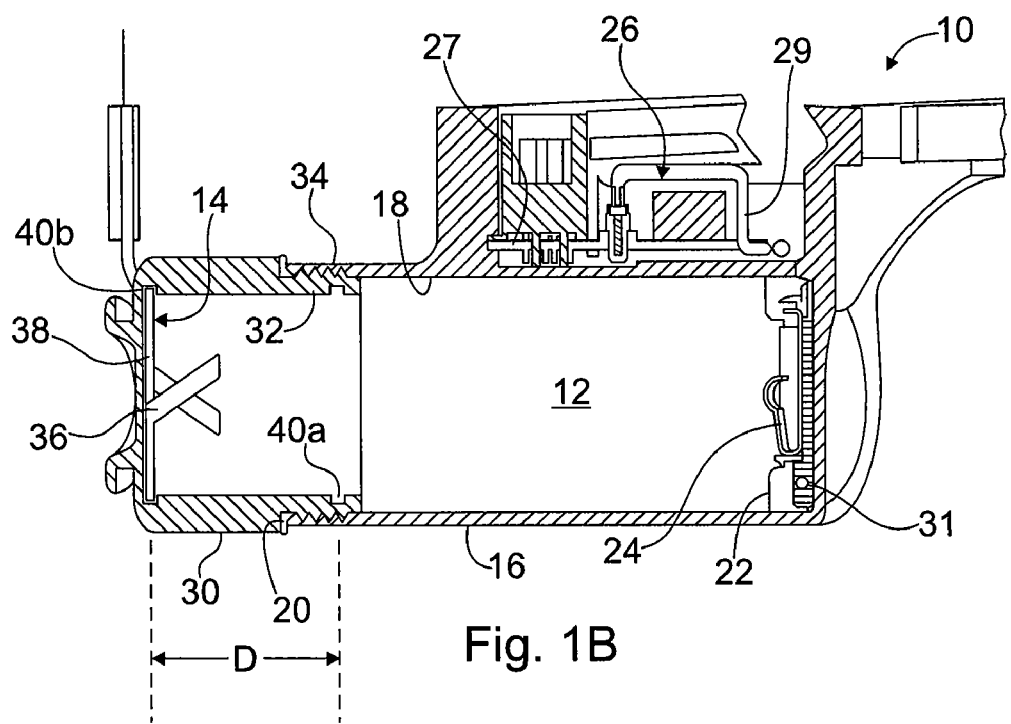
FIG. 1B depicts the battery compartment of FIG. 1A wherein the contact element is located in a second position to accommodate a double-'A' (i.e., 'AA') battery.

FIGS. 1A and 1B depict cross-sectional views of a battery compartment 12 of an electrical device 10. The battery compartment 12 of the electrical device 10 is configurable to accommodate either a DL123 battery or a AA battery. The electrical device 10 may be, for example, night vision goggles, a camera flash, a portable audio device, a portable video game or a computer.

The battery compartment 12 generally comprises a battery casing 16 including a substantially cylindrical recess 18 for at least partially encapsulating a battery (not shown), and a removable cover 30 for encapsulating the recess 18. The recess 18 includes an open end 20 for receiving a battery and a closed end 22 that is disposed opposite the open end 20. A first electrical contact element 24 is positioned on or adjacent the closed end 20 of the recess 18 for contacting a positive terminal of a battery (not shown). A second electrical contact element 14 is positioned on an interior surface of the cover 30 for contacting a negative terminal of a battery (not shown).

The battery compartment 12 is the substantially cylindrical space defined between the first and second electrical contact elements 24 and 14, respectively. A battery is positioned within the substantially cylindrical space between the first and second electrical contact elements 24 and 14, respectively.

The first electrical contact element 24 is electrically coupled to circuitry 26 of the electrical device 10 for distributing electrical power to the electrical device 10. The circuitry 26 may optionally include printed circuit boards 27 and 31 that are electrically interconnected by flex circuitry 29. The printed circuit board 31 is electrically connected to contact element 24, and printed circuit board 27 (or a conductive element) distributes electrical power to the electrical device 10. The first electrical contact element 24 is optionally fixed to the printed circuit board 31, and incapable of movement.

The contact element 24 is optionally a leaf spring. In an exemplary embodiment, contact element 24 may be made from a flexible, electrically conducting material such as Beryllium Copper (BeCu) alloy. In an alternative embodiment, contact element 24 may be formed from any other conductive metal or metal alloy. In another alternative embodiment, a coil spring may be used in lieu of a leaf spring.

An open-ended cylindrical cover 30 is configured to be releasably mounted to the open end 20 of the recess 18 for selectively concealing the open end 20 and defining the battery compartment 12. In a closed position of the cover 30, as shown, a battery (not shown) is completely encapsulated within the battery compartment 12.

The cover 30 includes a threaded region 32 disposed on an outer surface thereof for releasably engaging a threaded region 34 disposed on the open end 20 of the recess 18 of the battery casing 16. Those skilled in the art will recognize that cover 30 may be releasably engaged with battery casing 16 in a variety of different fashions without departing from the scope or spirit of the invention.

A second electrical contact element 14 is selectively positionable within the interior recess of the cover 30 for contacting an opposing terminal (e.g., negative terminal) of a battery. It follows that the interior surfaces of the cover 30 and the recess 18 of the battery casing 16 are electrically conductive to conduct electrical current from the battery terminal to circuitry 26. In FIG. 1A, the contact element 14 is located in a first position to accommodate a DL123 battery (not shown). FIG. 1B depicts the contact element 14 located in a second position to accommodate a double-'A' (i.e., 'AA') battery (not shown).

Figure 2:
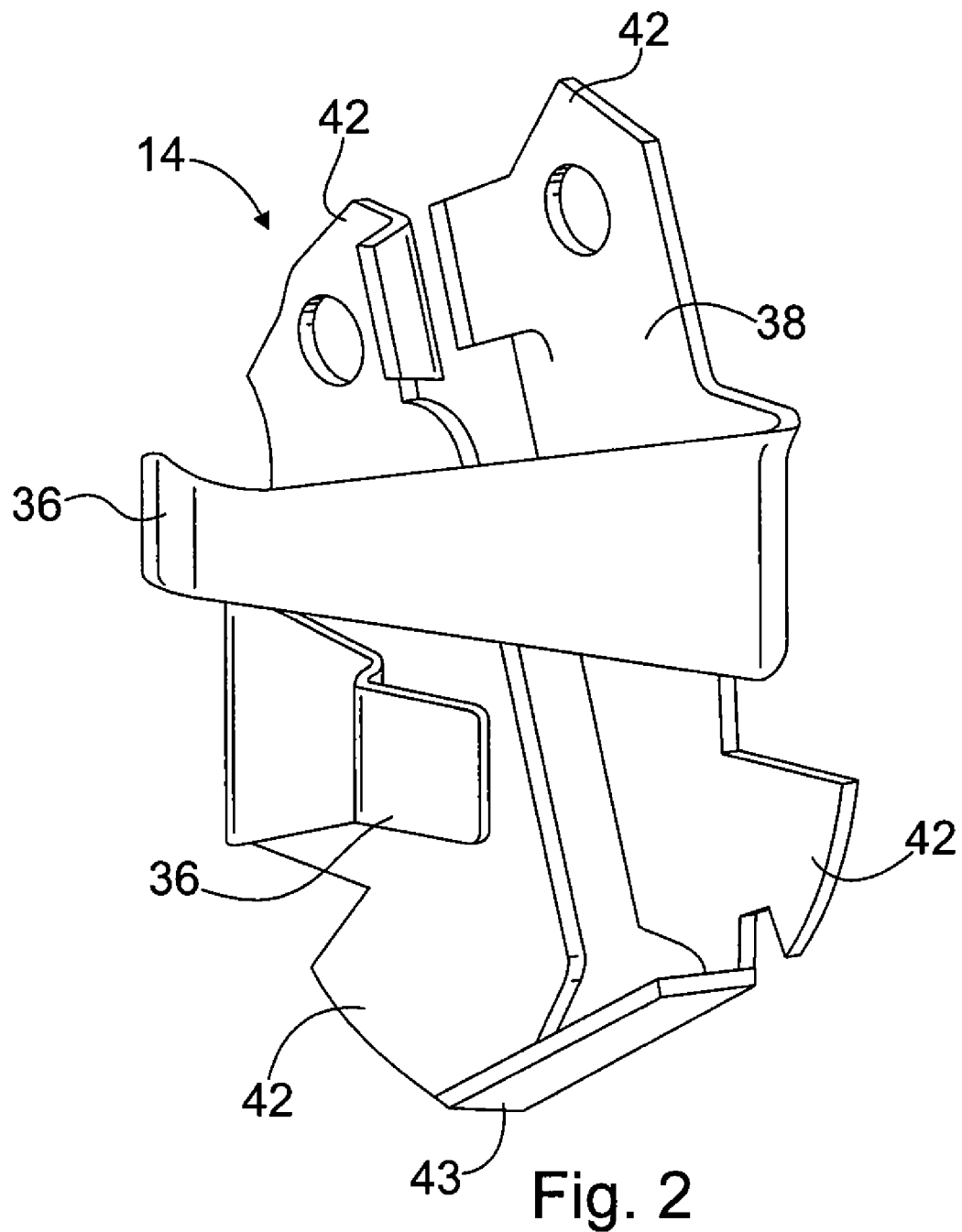
FIG. 2 depicts a perspective view of the contact element of FIGS. 1A and 1B.

FIG. 2 depicts a perspective view of the contact element 14 of FIGS. 1A and 1B. According to one aspect of the invention, the contact element 14 is a snap ring. The contact element 14 optionally includes two prongs 36 for compressively contacting the terminal of a battery (e.g., negative terminal)). The prongs 36 may provide a compressible distance to stabilize a battery within the battery compartment 12. The prongs 36 extend from a substantially cylindrical base portion 38. The base portion 38 includes one or more engagement portions 42 for selectively positioning along the interior surface of the cover 30, as described in greater detail later. Each engagement portion 42 may be a tab, as shown, or any other structure sized for engagement with the cover 30. A bent segment 43 of the base portion 38 is provided to enhance the structural integrity of contact element 14.

In an exemplary embodiment, contact element 14 is a unitary component formed from a flexible, electrically conductive material such as Beryllium Copper (BeCu) alloy. In an alternative embodiment, contact element 14 may be formed from any other conductive metal or metal alloy that is sufficiently elastic to permit positioning, removal, and repositioning of contact element 14 along the interior surface of the cover 30. In another alternative embodiment, a coil spring or a leaf spring may be used in lieu of a snap ring.

Referring now to FIGS. 1A, 1B and 2, the contact element 14 is selectively and manually positionable at multiple locations on the cover 30 for adjusting the size of the battery compartment 12 to accommodate batteries of varying size. More particularly, the second electrical contact element 14 is selectively and manually positionable between a first position (see FIG. 1A) for accommodating a 'DL123' battery within the battery compartment 12, and a second position (see FIG. 1B) for accommodating a 'AA' battery within the battery compartment 12.

The cover 30 includes a plurality of means for receiving 40A and 40B (referred to as 'means for receiving 40' collectively) the second electrical contact element 14. Each means for receiving 40 is positioned at a discrete location on the cover 30 and configured to independently receive the second electrical contact element 14. Adjacent means for receiving 40 are separated by a predetermined distance "D" (see FIG. 1B).

According to one aspect of the invention, each means for receiving 40 the second electrical contact element 14 is a groove 40 formed about the interior circumference of the cover 30. The grooves 40 may be formed along all or a portion of the interior circumference of the cover 30. Each groove 40 is sized to independently receive the engagement portions 42 of second electrical contact element 14. The means for receiving 40 may also be a pin, slot, detent, channel, sleeve, thread, magnet, fastener, adhesive, spring, surface, or any other structure, surface or geometry capable of receiving and retaining the contact element 14. Although only two means for receiving 40 are shown in FIGS. 1A and 1B, the cover 30 may include any number of means for receiving 40 for accommodating more than two battery sizes.

Although not shown, a standard double-A (i.e., AA) battery, manufactured according to ANSI specification 15A and IEC specification LR6, includes a substantially cylindrical body having a diameter of about 14.0 millimeters, and a length of about 40 millimeters. A standard DL123 battery, manufactured in accordance with ANSI specification 5018LC and IEC specification CR17345, includes a substantially cylindrical body having a diameter of about 16.5 millimeters, and a length of about 34 millimeters.

The length of the AA battery is about 6 millimeters greater than the length of the DL123 battery. Accordingly, the distance "D" separating the adjacent grooves 40 may be about 6 millimeters, and the total length of the battery compartment 12 (including the interior portion of the cover 30) should be greater than about 40 millimeters. Furthermore, the diameter of a DL123 battery is about 2.5 millimeters greater than the diameter of a AA battery. Accordingly, the interior diameter of the recess 18 of the battery casing 16 may be greater than about 16.5 millimeters to accommodate either a AA battery or a DL123 battery. It should be understood that this invention is not limited to any specific dimensions, and may vary from that described herein.

Those skilled in the art will recognize that the battery compartment 12 is not limited to accommodating either AA or DL123 batteries. The shape and size and the battery compartment may vary to accommodate any other battery sizes. Furthermore, the battery compartment is not limited to accommodating a single battery, and may accommodate any number of batteries. Accordingly, the electrical device 10 may include a plurality of battery compartments 12, moveable electrical contacts 14 and covers 30.

According to one exemplary use of the invention, a method of altering the size of a battery compartment of a battery-powered electrical device 10 is provided. The method includes the step of removing a contact element 14 that is configured for contacting the terminal of a battery from a first groove 40A formed along the interior circumference of the cover 30. The contact element 14 is then positioned in a second groove 40B that is formed along the interior circumference of the cover and separated from the first groove 40A. The contact element 14 is removed from the second groove 40B formed along the interior circumference of the cover 30. The contact element 14 is positioned in the first groove 40A formed in the cover 30. Each positioning step optionally includes the step of engaging a tab 42 of the electrical contact element 14 into a groove 40A or 40B of the cover 30. It should be understood that the foregoing steps are not limited to any step or sequence of steps.

Although the invention is illustrated and described herein with reference to specific embodiments, the invention is not intended to be limited to the details shown. Rather, various modifications may be made in the details within the scope and range of equivalents of the claims and without departing from the spirit of the invention. For example, the moveable contact element may reside in the recess of the battery casing and the fixed contact element may reside in the cover of the battery compartment.

What is claimed:

1. In a battery-powered electrical device, an expandable battery compartment for accommodating batteries of varying size, said battery compartment comprising:
   a battery casing defining a substantially cylindrical recess for at least partially encapsulating a battery, said recess having an open end for receiving a battery and a closed end;
   a first electrical contact element positioned on or adjacent the closed end of the recess for contacting a terminal of a battery, said first electrical contact being electrically coupled to circuitry of the electrical device;
   a cover configured to be releasably mounted to the open end of the recess for selectively concealing the open end and defining the battery compartment; and
   a second electrical contact element for contacting an opposing terminal of the battery, said second electrical contact element being selectively positionable at multiple locations on the cover to accommodate batteries of varying size within the battery compartment.

2. The battery compartment of claim 1, said cover comprising a plurality of means for receiving the second electrical contact element, wherein each means for receiving is positioned at a discrete location on the cover and configured to independently receive the second electrical contact element.

3. The battery compartment of claim 2, wherein adjacent means for receiving are separated by a predetermined distance.

4. The battery compartment of claim 2, wherein each means for receiving the second electrical contact element is a groove formed about the interior circumference of the cover, each groove being sized to independently receive the second electrical contact element.

5. The battery compartment of claim 4, said second electrical contact element including an engagement portion sized for insertion into a single groove formed in the cover.

6. The battery compartment of claim 1, wherein the second electrical contact element is selectively positionable between a first position for accommodating a 'DL123' battery within the battery compartment, and a second position for accommodating a 'AA' battery within the battery compartment.

7. The battery compartment of claim 1 further comprising a threaded region disposed on the cover for releasably engaging a threaded region disposed on the open end of the recess of the battery casing.

8. In a battery-powered electrical device, an expandable battery compartment for accommodating batteries of varying size, said battery compartment comprising:
   a battery casing defining a substantially cylindrical recess for at least partially encapsulating a battery, said recess having an open end for receiving a battery and a closed end;
   a first electrical contact element positioned on or adjacent the closed end of the recess for contacting a terminal of a battery, said first electrical contact being electrically coupled to circuitry of the electrical device;
   a cover configured to be releasably mounted to the open end of the recess for selectively concealing the open end and defining the battery compartment;
   a second electrical contact element for contacting an opposing terminal of the battery; and
   a plurality of means positioned on the cover for receiving the second electrical contact element, wherein each means for receiving is positioned at a discrete location on the cover and configured to independently receive the second electrical contact element to accommodate batteries of varying size within the battery compartment.

9. The battery compartment of claim 8, wherein adjacent means for receiving are separated by a predetermined distance.

10. The battery compartment of claim 8, wherein each means for receiving the second electrical contact element is a groove formed about the interior circumference of the cover, each groove being sized to independently receive the second electrical contact element.

11. The battery compartment of claim 8, said second electrical contact element including an engagement portion sized for insertion into a single groove formed in the cover.

12. The battery compartment of claim 8, wherein the second electrical contact element is selectively positionable between a first position for accommodating a 'DL123' battery within the battery compartment, and a second position for accommodating a 'AA' battery within the battery compartment.

13. The battery compartment of claim 8 further comprising a threaded region disposed on the cover for releasably engaging a threaded region disposed on the open end of the recess of the battery casing.

14. In a battery-powered electrical device including a battery casing defining a substantially cylindrical recess for at least partially encapsulating a battery, and a cover configured to be releasably mounted to an open end of the recess, a method of altering the size of the battery compartment comprising the steps of:
   removing an electrical contact element that is configured for contacting a battery terminal from a first groove formed along the interior circumference of the cover; and
   positioning the electrical contact element in a second groove that is formed along the interior circumference of the cover and separated from the first groove.

15. The method of claim 14, wherein the positioning step comprises engaging a tab of the electrical contact element into the second groove of the cover.

16. The method of claim 14 further comprising the steps of:
   removing the electrical contact element from the second groove formed along the interior circumference of the cover; and
   positioning the electrical contact element in the first groove formed in the cover.

* * * * *